United States Patent
Hayashi et al.

(10) Patent No.: US 6,433,296 B2
(45) Date of Patent: Aug. 13, 2002

(54) METHOD OF FORMING A FRAME JOINT STRUCTURE

(75) Inventors: Yoshihiro Hayashi; Katsuhiro Iwase, both of Hamamatsu (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/793,084

(22) Filed: Feb. 27, 2001

Related U.S. Application Data

(62) Division of application No. 09/329,214, filed on Jun. 10, 1999, now abandoned.

(30) Foreign Application Priority Data

Jun. 16, 1998 (JP) ............................................ 10-167898

(51) Int. Cl.[7] .............................................. B23K 11/20
(52) U.S. Cl. ................................ 219/117.1; 219/85.15; 228/133; 228/173.4
(58) Field of Search ................................. 228/126, 131, 228/133, 173.4, 60; 29/422; 219/117.1, 78.16, 85.15

(56) References Cited

U.S. PATENT DOCUMENTS

| | | | | |
|---|---|---|---|---|
| 1,907,910 A | * | 5/1933 | Wahlberg | .................... 219/104 |
| 2,066,668 A | * | 1/1937 | Bennett | .................... 219/117.1 |
| 2,091,982 A | * | 9/1937 | Hart | ............................ 219/107 |
| 2,554,328 A | * | 5/1951 | Grimes | ........................ 219/149 |
| 2,742,690 A | | 4/1956 | Kunkel | |
| 3,320,666 A | * | 5/1967 | Dion | ........................... 228/125 |
| 3,444,348 A | * | 5/1969 | Goodman | .................... 219/118 |
| 4,008,843 A | * | 2/1977 | Nagano et al. | ................. 228/33 |
| 4,317,277 A | | 3/1982 | Bennett et al. | |
| 4,435,972 A | | 3/1984 | Simon | |
| 4,749,116 A | * | 6/1988 | Yajima | .......................... 228/17 |
| 4,982,891 A | * | 1/1991 | Kimura et al. | .............. 228/155 |
| 5,059,056 A | | 10/1991 | Banthia et al. | |
| 5,301,926 A | | 4/1994 | Sharp | |
| 5,347,881 A | | 9/1994 | Watson et al. | |
| 5,368,223 A | * | 11/1994 | Chevrel et al. | .............. 219/106 |
| 5,767,477 A | | 6/1998 | Imamura | |
| 6,016,877 A | * | 1/2000 | Noonan et al. | .............. 172/776 |

OTHER PUBLICATIONS

Connor, Leonard P. ed., Welding Handbook "Resistance Welding", 1991, AMerican Welding Society, vol. 1, p. 16.*

* cited by examiner

*Primary Examiner*—Tom Dunn
*Assistant Examiner*—Colleen P. Cooke
(74) *Attorney, Agent, or Firm*—Birch, Stewart, Kolasch & Birch, LLP

(57) ABSTRACT

A seat frame assembly of a motorcycle has upper and lower pipes made of an aluminum alloy and having a rectangular cross-sectional shape. The upper and lower pipes have front ends constructed as joints, and solid spacers made of an aluminum alloy and having a cross-sectional shape substantially identical to the rectangular cross-sectional shape of the pipes are fitted in the joints. Flat side walls of each of the joints are sandwiched between flat electrodes of a resistance welding machine, and pressed and heated so as to be crimped on the spacer while an electric current is flowing between the flat electrodes.

15 Claims, 3 Drawing Sheets

METHOD OF FORMING A FRAME JOINT STRUCTURE

This application is a divisional of now abandoned application Ser. No. 09/329,214, filed on Jun. 10, 1999, the entire contents of which are hereby incorporated by reference and for which priority is claimed under 35 U.S.C. §120; and this application claims priority of Application No. 10-167898 filed in Japan on Jun. 16, 1998 under 35 U.S.C. §119.

BACKGROUND OF THE INVENTION

1. Field of the Invention

The present invention relates to the structure of a joint in a frame such as a vehicle frame.

2. Description of the Related Art

The rear frames of some vehicles such as motorcycles are constructed of pipes of a light metal such as aluminum alloy or the like. The pipes are usually in the form of lightweight hollow pipes having a rectangular cross-sectional shape which imparts desired flexural stiffness to the pipes. In a joint between frame pipes, a solid spacer having a cross-sectional shape that is substantially the same as the cross-sectional shape of the frame pipes is fitted in the frame pipes across the joint for reinforcing joint regions that are fastened by a bolt or the like.

The frame pipe and the spacer should be held in intimate contact with each other to enable the bolt to fasten them firmly together. Various methods are known for keeping the frame pipe and the spacer in close contact with each other. According to one method, the spacer is machined to desired accurate dimensions that match the inside diameter of the frame pipe, and press-fitted into the frame pipe with small forces. Another process uses a stamping press to crimp the frame pipe after the spacer has been inserted into the frame pipe. According to still another practice, a slit is cut in the pipe joint, the spacer is inserted into the pipe joint through the slit, the pipe is pressed to bring the pipe into intimate contact with the spacer, and thereafter the slit is welded.

However, the above known methods are disadvantageous for the following reasons: The first method of machining the spacer to accurate dimensions matching the inside diameter of the pipe is tedious and time-consuming, and highly costly. The second process of crimping the frame pipe with the stamping press fails to bring the frame pipe neatly into intimate contact with the spacer because the frame pipe of rectangular cross section is highly rigid at the walls as well as the corners. Furthermore, the second process tends to develop cracks in the frame pipe when the frame pipe is pressed under increased forces. The third practice of forming the slit in the pipe joint is effective to prevent the pipe frame cracking, but results in a substantial expenditure of labor, time, and expenses as it needs slitting and welding processes.

SUMMARY OF THE INVENTION

It is therefore an object of the present invention to provide a frame joint structure which has a pipe neatly crimped on a solid spacer fitted therein without cracking.

According to the present invention, there is provided a frame joint structure comprising a joint comprising a frame pipe of metal having a hollow cross-sectional shape, and a solid spacer of metal having a cross-sectional shape which is substantially identical to the hollow cross-sectional shape of the frame pipe, and fitted in the frame pipe, the frame pipe being pressed and heated so as to be crimped on the solid spacer fitted therein.

When the frame pipe is pressed while being heated, the frame pipe is subjected to increased plastic deformation, and hence can be brought into intimate contact with the solid spacer without cracking and with minimized springing back.

The frame pipe is pressed in a direction along which the frame pipe arid the solid spacer will be fastened together by a fastener such as a bolt or the like. The frame pipe may be of a square cross-sectional shape, a rectangular cross-sectional shape, a hexagonal cross-sectional shape, an octagonal cross-sectional shape, or any of other polygonal cross-sectional shapes. The frame pipe may be made of a ferrous metal or a nonferrous metal.

The frame pipe may be pressed and heated by flat electrodes of a resistance welding machine. When flat side walls of the frame pipe are pressed by the flat electrodes while an electric current is flowing therethrough, the frame pipe can be pressed uniformly, providing flat seats for the fastener on the flat side walls thereof. The flat electrodes may have a width greater than the width of the frame pipe for uniformly pressing the frame pipe.

The frame pipe should preferably be made of an aluminum alloy. Pipes of an aluminum alloy having a rectangular cross-sectional shape, which is strong enough to be used as frames, tend to crack when pressed by a stamping press. However, when such pipes are pressed while being heated, they are prevented from cracking under pressure. Because frames that need to be lightweight are increasingly made of an aluminum alloy in recent years, the frame joint structure according to the present invention offers increased practical values.

The above and other objects, features, and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
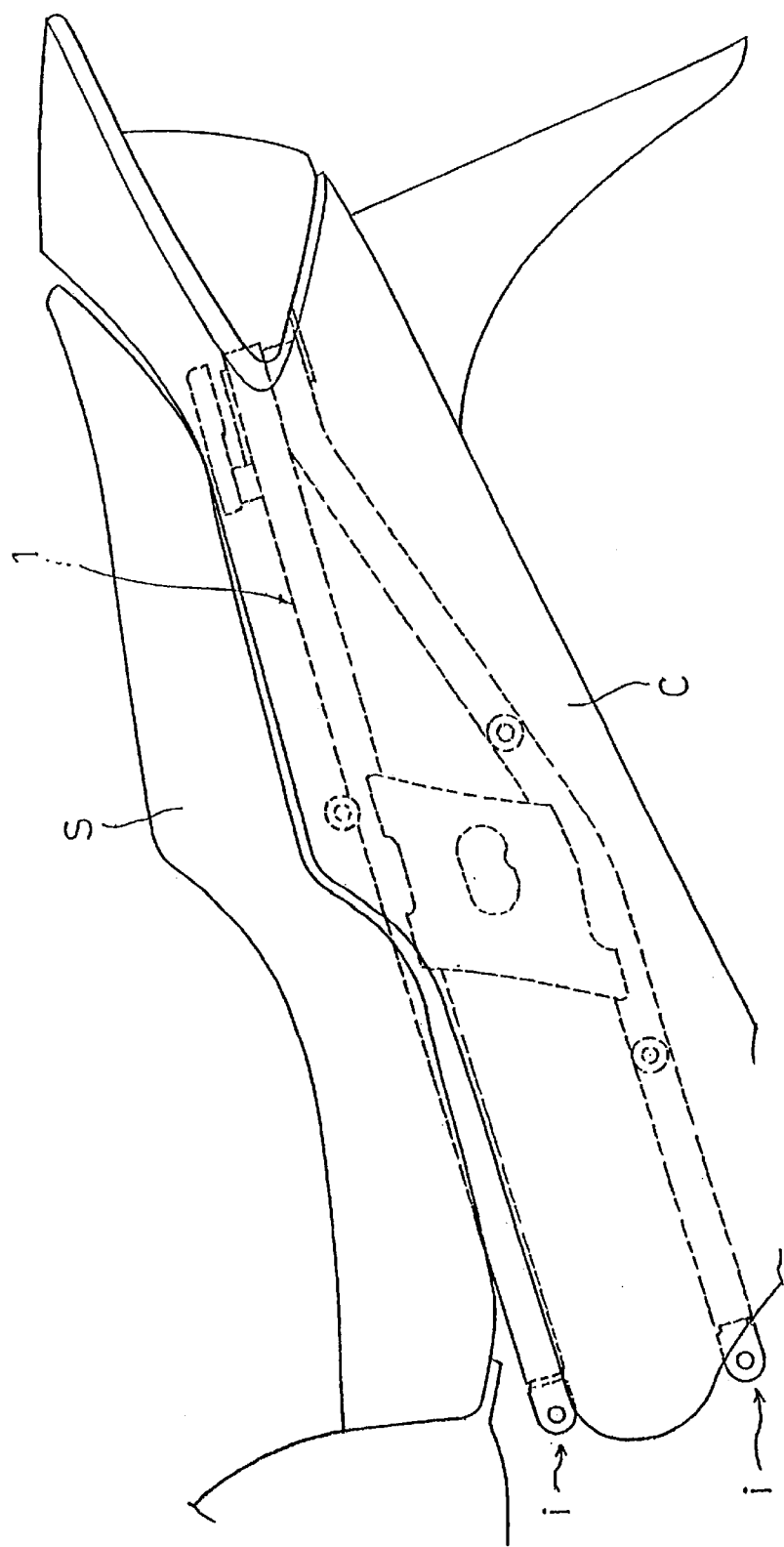
FIG. 1 is a fragmentary side elevational view of the rear frame of a motorcycle which incorporates a frame joint structure according to the present invention.

As shown in FIG. 1, a frame joint structure according to the present invention is incorporated in frame joints j of the rear frame of a motorcycle which includes a seat rail assembly 1. The motorcycle includes a rider's seat S mounted on the seat rail assembly 1 and a pair of side covers C covering opposite sides of the seat rail assembly 1.

Figure 2:
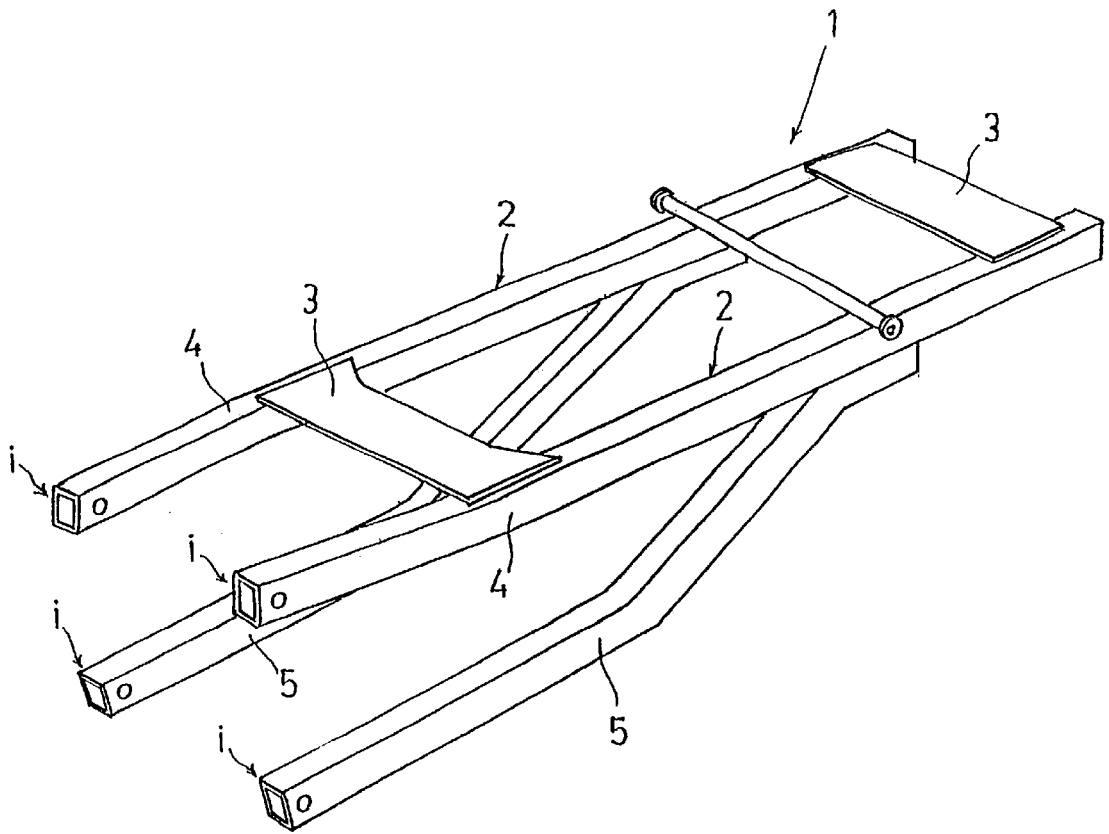
FIG. 2 is a perspective view of a skeleton of the rear frame shown in FIG. 1.

FIG. 2 shows the seat rail assembly 1 as a skeleton of the rear frame. As shown in FIG. 2, the seat rail assembly 1 comprises a pair of substantially parallel main frames 2 laterally spaced from each other and a plurality of cross frames 3 laterally extending between and interconnecting the main frames 2. The main frames 2 comprise respective upper pipes 4 each having a rectangular cross-sectional shape and respective lower pipes 5 each having a rectangular cross-sectional shape substantially identical to the rectangular cross-sectional shape of the upper pipes 4. The lower pipes 5 have respective front portions spaced downwardly from the upper pipes 4 and respective rear portions extending obliquely upwardly toward rear ends thereof which are integrally joined to the upper pipes 4.

The upper and lower pipes 4, 5 have respective front ends constructed as the frame joints j. The rear frame is connected to a front frame (not shown) of the motorcycle by the frame joints j.

Figure 3:
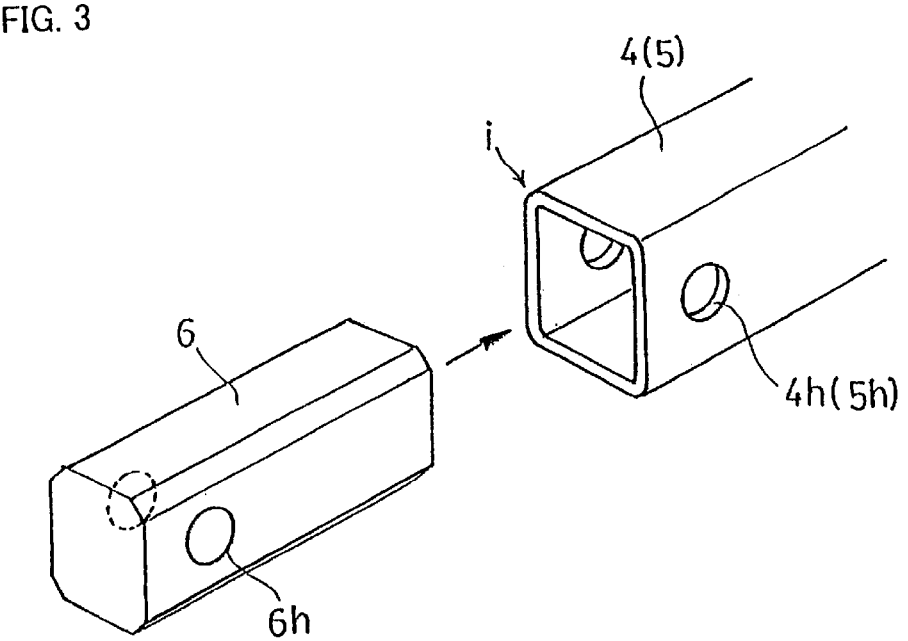
FIG. 3 is an exploded perspective view of a frame joint of the rear frame.

The seat rail assembly 1 is made of an aluminum alloy and hence is lightweight. Specifically, the seat rail assembly 1 constructed of pipes extruded of a T4 heat-treated aluminum alloy of A7000 series which has high tensile strength and yield strength. Since the joints j require higher mechanical strength, solid spacers 6 of an aluminum alloy shown in FIG. 3 are fitted in and fixed to the joints j.

Each of the spacers 6 has a cross-sectional shape which is essentially identical to the inner cross-sectional shapes of the upper and lower pipes 4, 5. When the spacers 6 are inserted into the pipes via the respective joints j, they fill the interior spaces of the joints j for thereby increasing the rigidity at the pipes of the joints j.

Each of the joints j has a pair of joint holes 4h, 5h defined in opposite side walls thereof and laterally aligned with each other. Each of the spacers 6 also has a lateral through hole 6h defined therein which can be aligned with the joint holes 4h, 5h when the spacer 6 is fitted in position in the joint j. After the spacer 6 is inserted in and fixed to the joint j, a fastener such as a bolt is inserted through the joint holes 4h, 5h and the through hole 6h to join the joint j and the spacer 6 to each other with increased mechanical strength.

Figure 5:
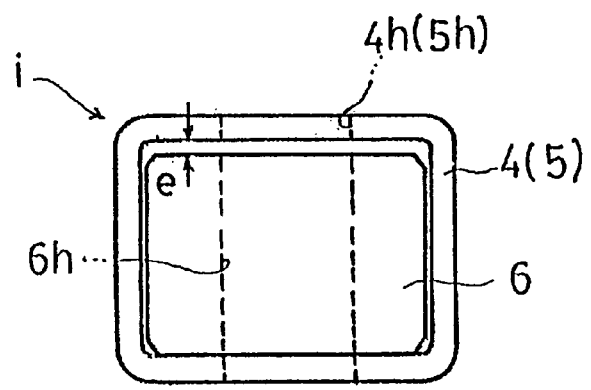
FIG. 5 is an elevational view showing the frame pipe before it is crimped.

When the spacers 6 are inserted into the respective pipes of the joints j, gaps having a size ranging from about 0.1 to 1.0 mm are created vertically and horizontally between the pipe and the spacer 6, as shown in FIG. 5. If the gap e between the pipe and the spacer 6 along the axes of the joint holes 4h, 5h and the through hole 6h is significantly large, then the joint j and the spacer 6 are not be fastened together stably enough by the fastener, and are insecurely joined to each other. Therefore, it is necessary to eliminate at least the gap e between the pipe and the spacer 6 along the axes of the joint holes 4h, 5h and the through hole 6h for thereby keeping the pipe and the spacer 6 in close contact with each other along the axes of the joint holes 4h, 5h and the through hole 6h.

If the joint j were simply stamped or pressed along the axes of the joint holes 4h, 5h and the through hole 6h to eliminate the gap e, then since the corners of the pipe are highly rigid and resistant to deformation, the pipes extruded of the T4 heat-treated aluminum alloy of A7000 series would tend to crack under excessive pressure applied to deform the pipes.

Figure 4:
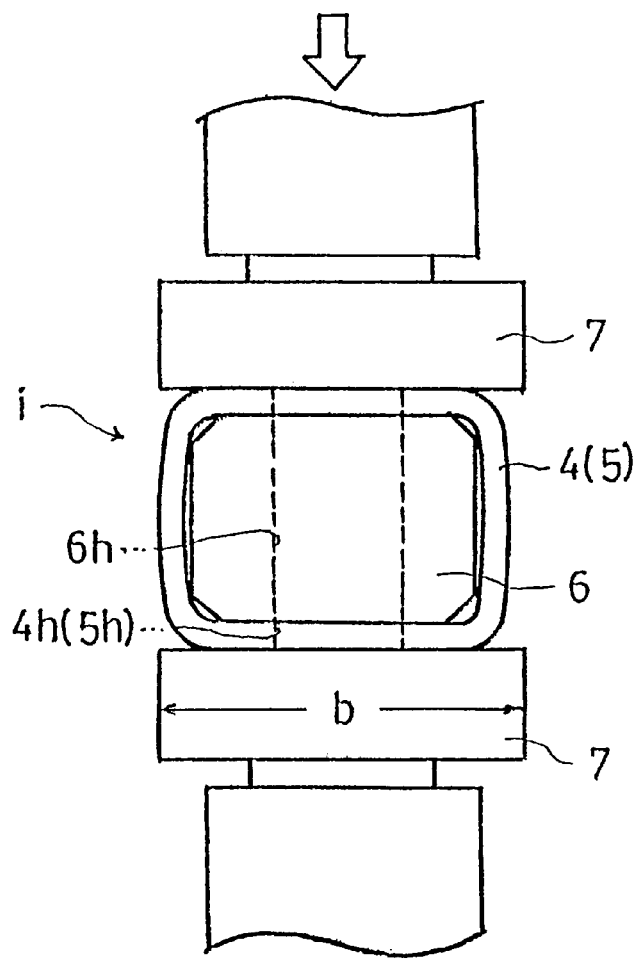
FIG. 4 is a fragmentary elevational view showing the manner in which a frame pipe of the frame joint is crimped by flat electrodes.

According to the present invention, as shown in FIG. 4, flat side walls of the pipe of each of the joints j are sandwiched between flat electrodes 7 of a resistance welding machine along the axes of the joint holes 4h, 5h and the through hole 6h, and pressed toward each other by the flat electrodes 7 while an electric current is flowing between the flat electrodes 7. Since the pipe at the joint j is heated by the electric current due to resistance heating, the pipe is made easily deformable under the pressure applied by the flat electrodes 7. At this time, intermediate portions of opposite side walls of the pipe are deformed so as to expand outwardly, eliminating the gap e, so that the flat side walls of the pipe are neatly brought into intimate contact with the spacer 6 along the axes of the joint holes 4h, 5h and the through hole 6h. When heated, the pipe at the joint j is subjected to increased plastic deformation, tending to minimize springing back of the deformed portions of the pipe.

In the illustrated embodiment, the flat electrodes 7 have a width b greater than the width of the pipe, and the pipe is pressed under a load of about *300* kg while a large current of about 27,000 A is flowing between the flat electrodes 7. Consequently, the flat electrodes 7 and the pipe are held against each other in a large area of contact, effectively heating and pressing the pipe to deform or crimp the pipe efficiently.

In this manner, the pipe of the joint j can easily and reliably be crimped on the spacer 6 inserted in the pipe for achieving a desired level of mechanical strength for the joint j.

While the pipes at the joints j have a rectangular cross-sectional shape in the illustrated embodiment, the pipes may have another polygonal cross-sectional shape. The pipes of the seat rail assembly 1 may be made of a metal other than the aluminum alloy.

The frame joint structure according to the present invention is also applicable to frame pipes and spacers which are free of joint holes and through holes. The principles of the present invention are also applicable to frame structures other than motorcycle frame structures.

Although a certain preferred embodiment of the present invention has been shown and described in detail, it should be understood that various changes and modifications may be made therein without departing from the scope of the appended claims.

What is claimed is:

1. A method of forming a frame joint comprising:
   providing a frame pipe having a hollow open end;
   inserting a spacer into the hollow open end;
   heating the frame pipe adjacent the hollow open end;
   pressing the frame pipe so as to reduce a gap existing between the open end of the frame pipe and the spacer;
   providing aligned through holes on opposite sides of the frame pipe;
   providing a through hole in the spacer;
   aligning the though holes of the frame pipe and the spacer; and inserting a fastener through the aligned through holes.

2. The method according to claim 1, wherein said step of heating includes passing an electric current through the frame pipe.

3. The method according to claim 2, wherein the electric current has an amperage of approximately 27,000 amps.

4. The method according to claim 2, wherein said step of passing an electric current through the frame pipe includes contacting the frame pipe with two electrodes of a resistance welding machine.

5. The method according to claim 4, wherein said step of pressing includes pressing the frame pipe between the two electrodes.

6. The method according to claim 1, wherein the frame pipe is pressed on opposite sides.

7. The method according to claim 1, wherein said step of pressing the frame pipe includes applying a load of approximately 300 kilograms.

8. A method of forming a frame joint comprising:

providing a metal frame pipe having a hollow open end;

inserting a spacer into the hollow open end;

heating the metal frame pipe adjacent the hollow open end;

pressing the metal frame pipe so as to reduce a gap existing between the metal frame pipe and the spacer;

providing aligned through holes on opposite sides of the frame pipe;

providing a through hole in the spacer;

aligning the though holes of the frame pipe and the spacer; and inserting a fastener through the aligned through holes.

9. The method according to claim 8, wherein the metal frame pipe is constructed of a metal including aluminum.

10. The method according to claim 8, wherein the spacer is constructed of a solid metal including aluminum.

11. The method according to claim 8, wherein the metal frame pipe has a rectangular cross sectional shape, adjacent to the hollow open end, and wherein the spacer has a rectangular outer cross sectional shape, which is substantially the same as the rectangular cross sectional shape of the metal frame pipe.

12. The method according to claim 11, wherein said step of pressing includes applying a pressure on opposed sides of the rectangular cross sectional shape of the metal frame pipe.

13. The method according to claim 12, wherein said step of heating includes passing an electric current through the metal frame pipe, by contacting the metal frame pipe with two electrodes.

14. The method according to claim 13, wherein the two electrodes are contacted to respective ones of the opposed sides of the rectangular cross sectional shape of the metal frame pipe.

15. The method according to claim 14, wherein the pressure applied during said step of applying a pressure on opposed sides, is applied via the two electrodes.

* * * * *